United States Patent
Ali

(10) Patent No.: US 11,004,132 B2
(45) Date of Patent: May 11, 2021

(54) SYSTEMS AND METHODS FOR USE IN INITIATING PAYMENT ACCOUNT TRANSACTIONS TO ACQUIRERS

(71) Applicant: MASTERCARD INTERNATIONAL INCORPORATED, Purchase, NY (US)

(72) Inventor: Muhammad Yaseen Ali, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 219 days.

(21) Appl. No.: 15/451,871

(22) Filed: Mar. 7, 2017

(65) Prior Publication Data

US 2018/0260872 A1    Sep. 13, 2018

(51) Int. Cl.
| | |
|---|---|
| *G06Q 30/00* | (2012.01) |
| *G06Q 30/06* | (2012.01) |
| *G06Q 20/10* | (2012.01) |
| *G06F 16/22* | (2019.01) |
| *G16Y 10/50* | (2020.01) |

(52) U.S. Cl.
CPC ......... *G06Q 30/0625* (2013.01); *G06F 16/22* (2019.01); *G06Q 20/102* (2013.01); *G16Y 10/50* (2020.01)

(58) Field of Classification Search
CPC .................................................. G06Q 30/0625
See application file for complete search history.

(56) References Cited

U.S. PATENT DOCUMENTS

| | | |
|---|---|---|
| 6,204,763 B1 | 3/2001 | Sone |
| 10,158,480 B1 | 12/2018 | Winklevoss et al. |
| 2005/0022848 A1* | 2/2005 | Crisp, III .............. B67D 1/0858 134/57 D |
| 2005/0131578 A1 | 6/2005 | Weaver |
| 2012/0239481 A1 | 9/2012 | Yankovich et al. |
| 2014/0333324 A1 | 11/2014 | Kabler et al. |

(Continued)

OTHER PUBLICATIONS

Elvy, Stacy-Ann. "Hybrid Transactions and the Internet of Things: Goods, Services, or Software." Wash. & Lee L. Rev. 74 (2017):77.*

(Continued)

*Primary Examiner* — Kathleen Palavecino
(74) *Attorney, Agent, or Firm* — Harness, Dickey & Pierce, P.L.C.

(57) ABSTRACT

Disclosed are exemplary embodiments of systems and methods for facilitating payment account transactions to acquirers, based on purchase requests by Internet of Things (IoT) devices. In an exemplary embodiment, a method generally includes receiving, by an interface processor, a message from an IoT device at a premises where the message includes a condition related to the IoT device, and determining, by the interface processor, based on at least one rule in memory, whether to initiate a transaction at a merchant to purchase a product and/or a related product based on the condition. The method then further includes transmitting to an acquirer associated with the merchant, by the interface processor, rather than to the merchant, an authorization request for the transaction for the product and/or the related product when the condition satisfies the at least one rule.

19 Claims, 3 Drawing Sheets

(56) References Cited

U.S. PATENT DOCUMENTS

Figure 1:
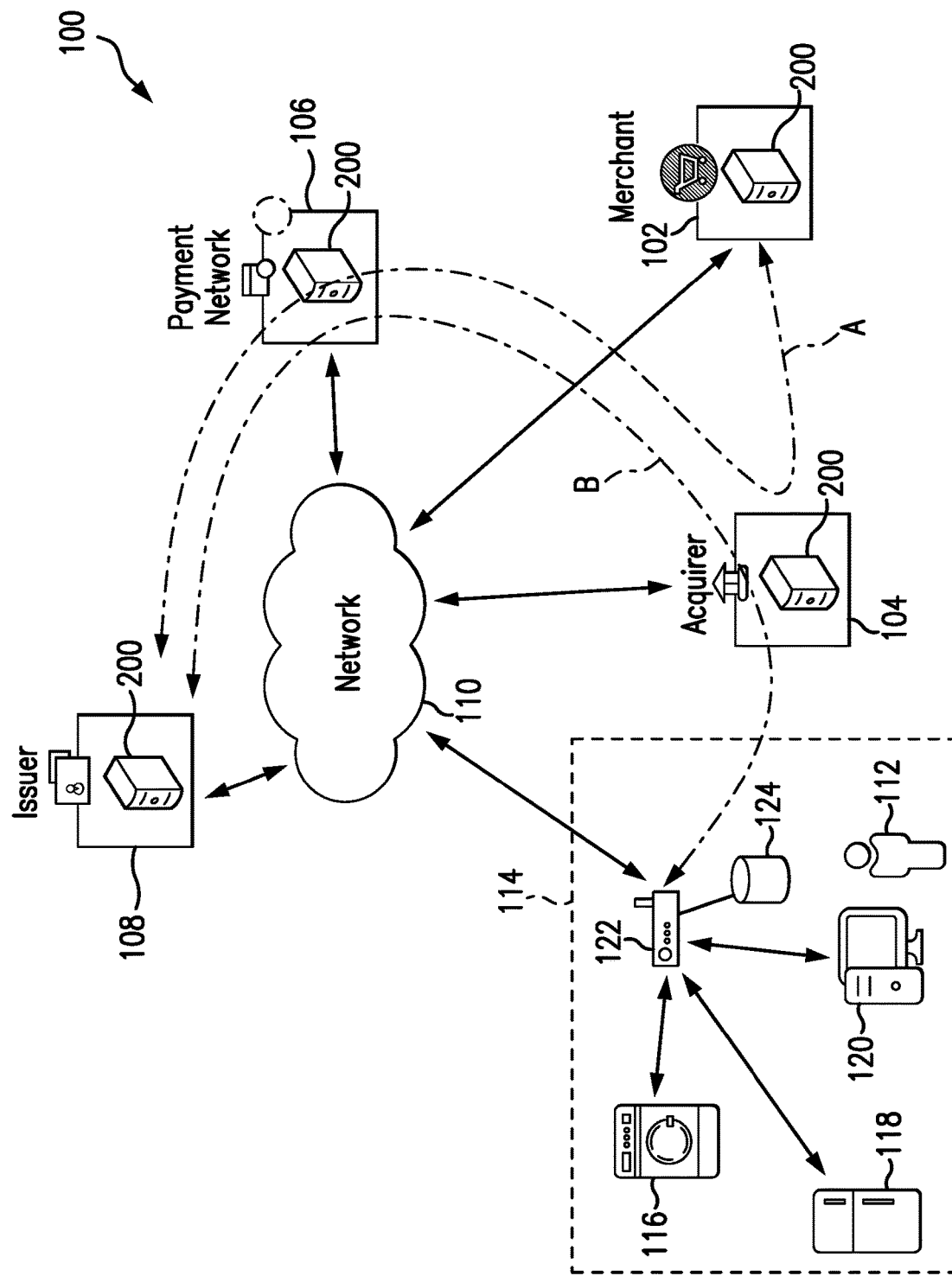

| | | | |
|---|---|---|---|
| 2014/0358789 A1 | 12/2014 | Boding et al. | |
| 2015/0178654 A1 | 6/2015 | Glasgow et al. | |
| 2016/0072788 A1 | 3/2016 | Chhabra | |
| 2016/0132009 A1 | 5/2016 | Gnabau et al. | |
| 2017/0148090 A1* | 5/2017 | Davi | G06Q 30/06 |
| 2017/0171314 A1 | 6/2017 | Britt | |
| 2017/0187588 A1* | 6/2017 | Nolan | H04W 4/70 |
| 2017/0213215 A1 | 7/2017 | Lee et al. | |
| 2017/0279620 A1 | 9/2017 | Kravitz et al. | |
| 2017/0302641 A1* | 10/2017 | Ramatchandirane | G06Q 20/123 |
| 2018/0082038 A1* | 3/2018 | Blair, II | G06Q 10/087 |
| 2018/0232734 A1 | 8/2018 | Smets et al. | |
| 2019/0043103 A1 | 2/2019 | De Las Heras et al. | |
| 2019/0268332 A1 | 8/2019 | Wang | |

OTHER PUBLICATIONS

U.S. Appl. No. 15/417,164: Office Action dated Jan. 28, 2019 issued in U.S. Appl. No. 15/417,164. U.S. Appl. No. 15/417,164 has common subjuct matter as the instant application and the same Applicant, Mastercard International Incorporated.

PCT International Search Report and Written Opinion (11 pages) of PCT Patent Application No. PCT/US2018/014315, dated May 7, 2018. PCT Patent Application No. PCT/US2018/014315 has common subject matter as the instant application and the same Applicant, Mastercard International Incorporated.

U.S. Appl. No. 15/417,164, filed Jan. 26, 2017, Lee et al.

U.S. Appl. No. 15/429,524, filed Feb. 10, 2017, Smets et al.

U.S. Appl. No. 15/668,926, filed Aug. 4, 2017, De Las Heras et al.

U.S. Appl. No. 15/429,524: Office Action dated Apr. 30, 2020 issued in U.S. Appl. No. 15/429,524. U.S. Appl. No. 15/429,524 has common subject matter as the instant application and the same Applicant, Mastercard International Incorporated. As a note, the references cited in the Office Action are already of record in the instant application.

U.S. Appl. No. 15/668 926: Office Action dated Apr. 30, 2020 issued in U.S. Appl. No. 15/668,926. U.S. Appl. No. 15/668,926 has common subject matter as the instant application and the same Applicant, Mastercard International Incorporated.

* cited by examiner

SYSTEMS AND METHODS FOR USE IN INITIATING PAYMENT ACCOUNT TRANSACTIONS TO ACQUIRERS

FIELD

The present disclosure generally relates to systems and methods for use in initiating payment account transactions to acquirers and, in particular, to systems and methods for use in enabling Internet of Things (IoT) devices to initiate payment account transactions with merchants directly to acquirers associated with the merchants, rather than to the merchants themselves.

BACKGROUND

This section provides background information related to the present disclosure which is not necessarily prior art.

Payment account transactions are knowns as a means for funding the purchase of goods and services (broadly, products) from merchants. Consumers often initiate such payment account transactions by presenting credentials for their corresponding payment accounts to the merchants. Then, once the desired products are purchased, the use of the products may give rise to the need for the consumers to replenish or repurchase the products. In such instances, the consumers return to the merchants, or to different merchants, to repurchase the products, again often relying on their payment accounts to fund the purchases for the products. Separately, devices are increasingly known to be equipped with network connectivity technology, enabling them to connect to each other and to the Internet, and thereby generally forming the "Internet of Things" (IoT). Examples of such devices include washing machines, refrigerators, televisions, security devices, thermostats, etc. In many cases, these devices have primary purposes or functionality unrelated to the transfer of data over a network (e.g., refrigerators are intended to maintain food products at specified temperatures, etc.).

DRAWINGS

The drawings described herein are for illustrative purposes only of selected embodiments and not all possible implementations, and are not intended to limit the scope of the present disclosure.

Figure 2:
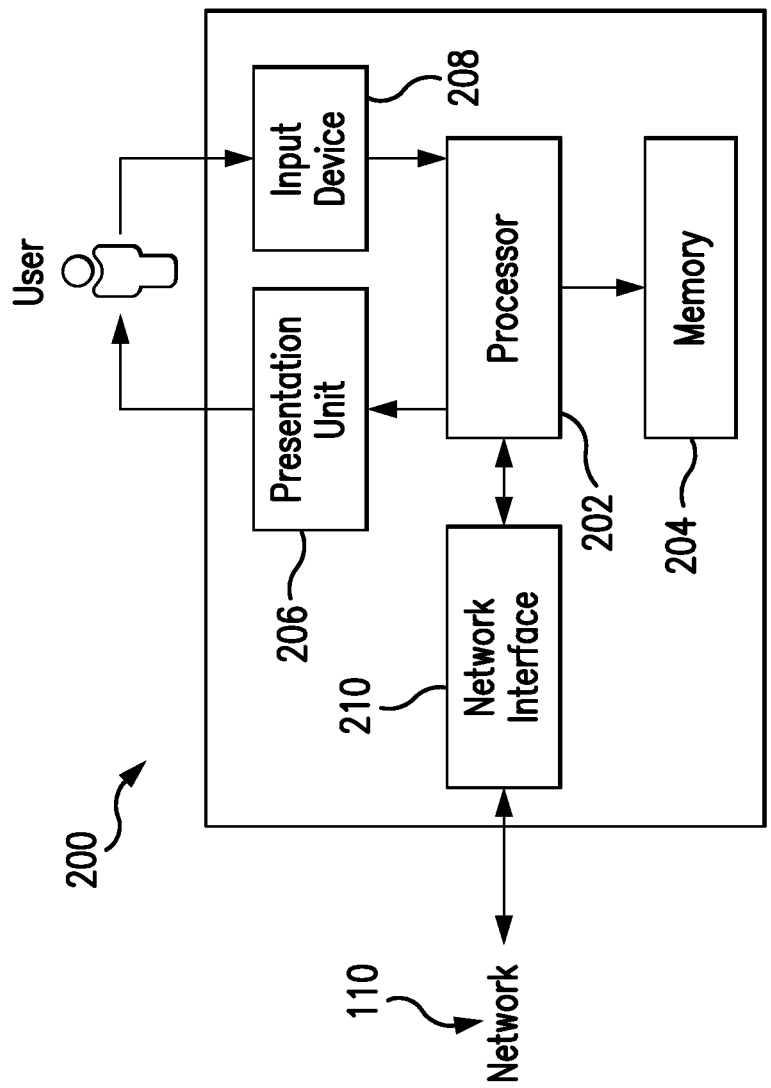
Figure 3:
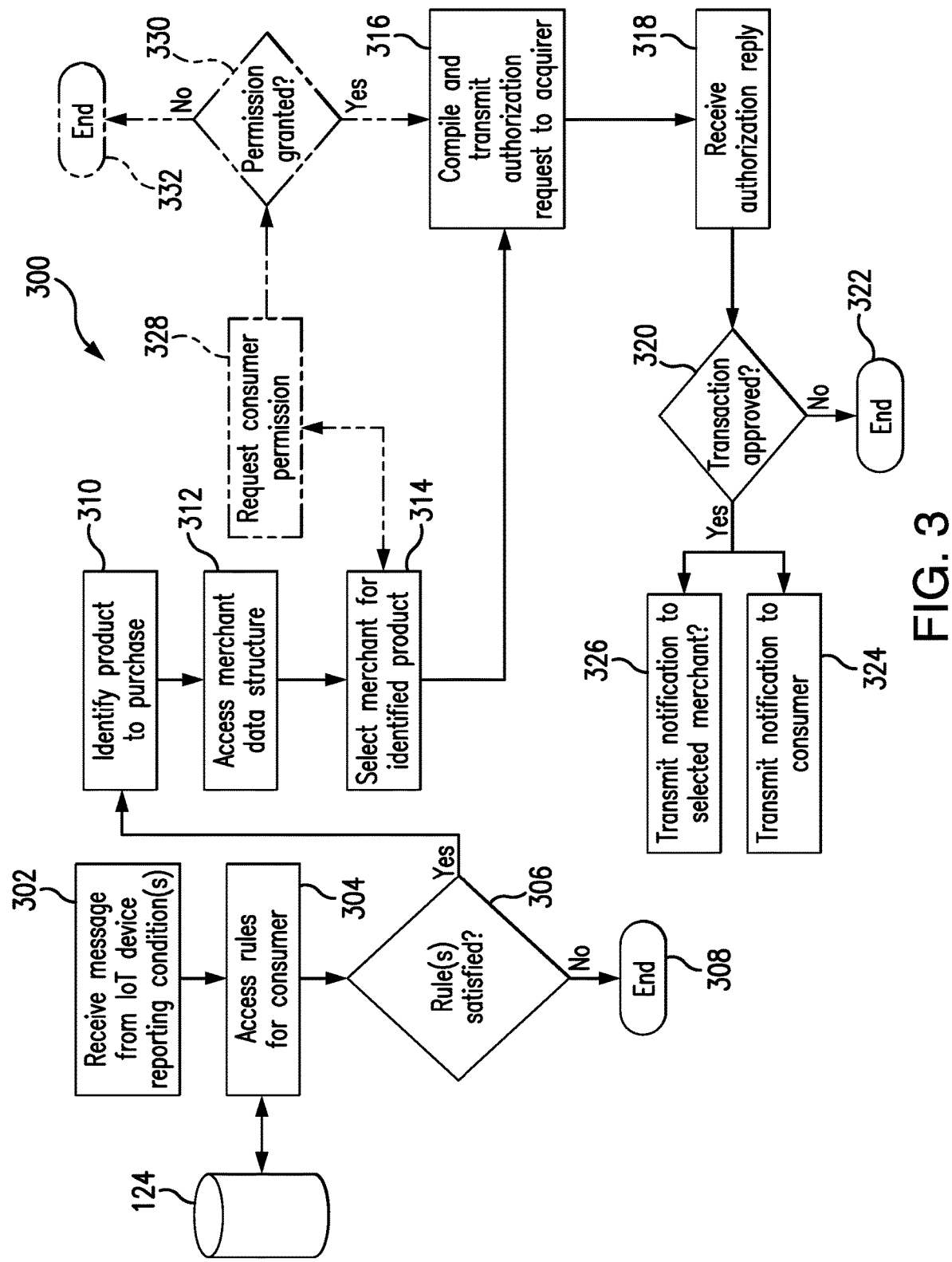

FIG. 1 is a block diagram of an exemplary system of the present disclosure suitable for use in enabling interface processors (IPs), linked to Internet of Things (IoT) devices, to facilitate payment account transactions by the IoT devices to acquirers;

FIG. 2 is a block diagram of a computing device suitable for use in the exemplary system of FIG. 1; and FIG. 3 is an exemplary method, which may be implemented in connection with the system of FIG. 1, for facilitating a payment account transaction by an IoT device at a merchant, where the payment account transaction is directed to an acquirer associated with the merchant rather than to the merchant.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Numerous devices in a consumer's home, office, and/or other premises may be network connected to thereby provide an "Internet of Things" (IoT) within the home, office, and/or other premises. Such IoT devices may include, for example, refrigerators, washing machines, televisions, coffee makers, lights, wearable devices, health care devices, HVAC devices, security devices, etc. Uniquely, in connection with a purchase request by one of the IoT devices for a product at a merchant, the systems and methods herein enable an interface processor (IP) (e.g., a MasterCard Interface Processor (MIP), etc.), at the consumer's home, office, and/or other premises, to communicate a payment account transaction for the purchase directly to an acquirer for the merchant, rather than to the merchant. For example, when a certain condition occurs regarding the IoT device and/or the product, the IoT device reports the condition to the IP (e.g., as part of a product request, etc.), which, in turn, determines if a payment account transaction for the product should be facilitated in response to the condition. When the IP determines that a payment account transaction should be facilitated, the IP then employs numerous rules, as defined by the consumer, for example, to facilitate the purchase of the product. And, the IP directs an authorization request for the payment account transaction to the acquirer for the merchant associated with the product, rather than to the merchant. As such, the payment account transaction can be conveniently performed by the IP in a secure manner and without need to direct the payment account transaction, or credentials associated with the underlying payment account, to the merchant (with various fraud services still applied to the transaction at a payment network and/or issue involved in processing the transaction).

FIG. 1 illustrates an exemplary system 100 in which one or more aspects of the present disclosure may be implemented. Although, in the described embodiment, the system 100 is presented in one arrangement, other embodiments may include the system 100 arranged otherwise, depending, for example, on manners in which payment account transactions are initiated and/or executed by IoT devices, manners in which such payment account transactions are processed, etc.

Referring to FIG. 1, the system 100 includes a merchant 102, an acquirer 104 associated with the merchant 102, a payment network 106, and an issuer 108 of payment accounts, each coupled to (and in communication with) network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In addition, the network 110 may include multiple networks, where different ones of the multiple networks are accessible to different ones of the illustrated parts in FIG. 1. For example, the network 110 may include a private payment transaction network made accessible by the payment network 106 to the acquirer 104 and the issuer 108 and, separately, a public network (e.g., the Internet, etc.) provided for communication between the merchant 102 and the acquirer 104 (e.g., via a website or via network-based applications, etc.) or through which a consumer 112 may communicate, as desired.

Generally in the system 100, the merchant 102 offers products (e.g., goods and/or services, etc.) for sale to consumers, including the consumer 112. The merchant 102 may include one or more brick-and-mortar locations and/or one or more virtual locations (e.g., accessible via the network 110, etc.). In connection therewith, the merchant 102 may provide one or more physical and/or virtual storefronts, through which the consumer 112 is able to select, find, view, review and/or evaluate the products for purchase and/or to ultimately purchase the products. The products, of course, may include any different types of products, such that the scope of the present disclosure is not limited to any particular type or category of such products.

In addition in the system 100, the consumer 112 is associated with a payment account issued by the issuer 108. The consumer 112, then, is able to use the payment account to fund purchase transactions with the merchant 102 (as payment account transactions) and/or with other merchants.

In an example transaction at the merchant 102 for a product, the consumer 112 presents payment credentials associated with his/her payment account (e.g., a primary account number (PAN), an account owner name, an expiration date, a card verification code (CVC), a token, etc.) to the merchant 102 (directly or via a payment device associated with the consumer's account). In addition to the credentials, the consumer 112 may further be prompted to provide one or more forms of authentication, such as, for example, a password, a PIN, a biometric, etc.

In turn in the example transaction, the merchant 102 reads/receives the payment credentials for the consumer's payment account. As is conventional, the merchant 102 then causes an authorization request for the transaction (including the payment credentials and the product details), to be transmitted to the acquirer 104, along path A in the system 100. Upon receipt, the acquirer 104 communicates the authorization request with the issuer 108 through the payment network 106, such as, for example, through Master-Card®, VISA®, Discover®, American Express®, etc. The issuer 108 determines whether the consumer's payment account is in good standing and whether there are sufficient funds and/or credit to fund the transaction. The payment network 106 and/or the issuer 108 also perform various fraud detection services, as is conventional, in connection with the transaction, as the authorization request travels along path A. If approved, an authorization reply, or response (indicating the approval of the transaction), is transmitted back from the issuer 108 to the merchant 102 again along path A, thereby permitting the merchant 102 to complete the transaction. The transaction is later cleared and/or settled (via appropriate transaction messages such as clearing messages and/or settlement messages, for example) by and between the merchant 102, the acquirer 104, and the issuer 108 (by appropriate agreements). If the transaction is declined, however, an authorization reply (indicating the decline of the transaction) is provided back to the merchant 102, thereby permitting the merchant 102 to halt or terminate the transaction, or request alternate funding.

Transaction data is generated, collected, and stored as part of the above interactions among the merchant 102, the acquirer 104, the payment network 106, the issuer 108, and the consumer 112 (for the example transaction and for other transactions). The transaction data represents at least a plurality of transactions involving the above parts of the system 100, including, for example, authorized transactions, cleared and/or settled transactions, attempted transactions, etc. The transaction data, in this exemplary embodiment, is stored at least by the payment network 106 (e.g., in a data structure associated with the payment network 106, etc.), but could be stored in other parts of the system 100. Additionally, or alternatively, transaction data may be transmitted among parts of the system 100 as desired and/or necessary. As used herein, transaction data may include, for example (and without limitation), PANs for accounts involved in the transactions, amounts of the transactions, merchant IDs for merchants involved in the transactions, merchant category codes (MCCs), dates/times of the transactions, geo-locations of the transactions, device identifiers of IoT devices involved in the transactions, etc. It should be appreciated that other information related to transactions may be stored within the system 100, in particular at the payment network 106, aside from the authorization or clearing data, as well.

In various exemplary embodiments, consumers (e.g., consumer 112, etc.) involved in the different transactions herein are prompted to agree to legal terms associated with their payment accounts, for example, during enrollment in their accounts, during installation of applications relating to use of their accounts, etc. In so doing, the consumers may voluntarily agree, for example, to allow merchants, issuers, payment networks, etc., to use data collected during enrollment, collected in connection with such applications, and/or collected in connection with processing the transactions herein, subsequently for one or more of the different purposes described herein.

With continued reference to FIG. 1, the consumer 112 is generally located in premises 114. The premises 114 may include, without limitation, a residence, a house, an apartment, a condominium, a place of business, an office, another location, structure, or area, a combination thereof, etc. The premises 114 includes IoT devices 116 and 118, which, in this exemplary embodiment, are illustrated as a washing machine 116 and a refrigerator 118, respectively. In general, the IoT devices 116 and 118 are included at the premises 114 for a primary function, such as, for example, to wash clothing (via the washing machine 116) or to maintain food items at a selected temperature (via the refrigerator 118). It should be appreciated that various other IoT devices may be included at the premises 114, including, without limitation, televisions, coffee makers, lights, pool pumps, lawn device, HVAC devices, health care devices, wearable devices, security devices, vehicles, etc. The IoT devices 116 and 118 at the premises 114, then, are in communication with each other and potentially with other devices (e.g., other IoT devices, etc.) via a network, which may be specific to the premises 114 and/or incorporated with the network 110, to enable controlling, changing, and/or monitoring of the various IoT devices (including the IoT devices 116 and 118), etc.

The consumer 112 is also associated with a computing device 120 at the premises configured (e.g., via executable instructions, etc.) to operate as described herein. In the illustrated embodiment, the computing device 120 is illustrated as a desktop computing device. However, it should be appreciated that in other embodiments, the computing device 120 may alternatively (or additionally) include, without limitation, a laptop; communication devices such as a smartphone, a tablet, etc.; etc.

FIG. 2 illustrates an exemplary computing device 200 used in the system 100. The computing device 200 may include, for example, one or more servers, workstations, routers, personal computers, tablets, laptops, smartphones, PDAs, etc. In addition, the computing device 200 may include a single computing device, or it may include multiple computing devices located in close proximity or distributed over a geographic region, so long as the computing devices are specifically configured to function as described herein. In the system 100, each of the merchant 102, the acquirer 104, the payment network 106, and the issuer 108 are illustrated as including, or being implemented in, a computing device 200, coupled to (and in communication with) the network 110. In addition, each of the IoT devices 116 and 118 and the computing device 120 may be considered a computing device consistent with computing device 200. However, the system 100 should not be considered to be limited to the computing device 200, as described below, as different computing devices and/or arrangements of computing devices may be used. In addition, different components and/or arrangements of components may be used in other computing devices.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, rules, merchant profiles (e.g., merchant names, merchant addresses, product names and/or identifiers, prices per product, shipping terms, acquirer names, acquirer identifiers and/or addresses, etc.), payment account credentials (e.g., PANs, expiration dates, CVCs, tokens, etc.), and/or other types of data suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information, (e.g., rules, etc.) either visually or audibly to a user of the computing device 200 (e.g., to the consumer 112, etc.). In addition, it should be appreciated that various interfaces (e.g., network-based interfaces (e.g., websites, applications, etc.), etc.) may be displayed at computing device 200, and in particular at presentation unit 206, to solicit information (e.g., for registration of one or both of the IoT devices 116 and 118, for receiving rules from the consumer 112, etc.) from the consumer 112. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, registration inputs for IoT devices 116 and 118, entry of rules, etc. The input device 208 is coupled to (and is in communication with) the processor 202 and may include, for example, a keyboard, a pointing device, a mouse, a button, a stylus, a touch sensitive panel (e.g., a touch pad or a touch screen, etc.), a camera or other optical input device, another computing device, and/or an audio input device. Further, in various exemplary embodiments, a touch screen, such as that included in a tablet, a smartphone, or similar device, may behave as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter (e.g., a WI-FI adapter, an NFC adapter, a Bluetooth® adapter, etc.), a mobile network adapter, or other device capable of communicating to/with one or more different networks, including the network 110 in the system 100. Further, in some exemplary embodiments, the computing device 200 includes the processor 202 and one or more network interfaces 210 incorporated into or with the processor 202.

With reference again to FIG. 1, the system 100 further includes an interface processor (IP) 122 (e.g., a MasterCard® Interface Processor (MIP), etc.) located at the consumer's premises 114. In general, the IP 122 is configured, by computer-executable instructions (e.g., defining an application, etc.), to perform one or more of the operations described herein. In connection therewith, the IP 122 may be considered a computing device consistent with computing device 200, and is coupled to each of the IoT devices 116 and 118 and the computing device 120, via one or more networks (as indicated by the arrows), to allow for communication there between. Such coupling may be directly between the IoT devices 116 and 118 and the IP 122, or it may be facilitated by one or more routers.

In particular in the system 100, the IP 122 is configured to initially register one or both of the IoT devices 116 and 118 thereto (and potentially any other IoT devices at the premises 114). For example, upon initially installing the IoT device 116 at the premises 114 (e.g., upon activating or powering the IoT device 116, etc.), the IoT device 116 is configured to discover and connect to the IP 122 and to send its name and or device ID to the IP 122. The IP 122 is configured to then store the received data for the IoT device 116 in data structure 124 in memory (e.g., in memory 204, etc.) associated with the IP 122. In connection therewith, the consumer 112 accesses the IP 122 via the computing device 120 (e.g., via a user interface, etc.). In response, the IP 122 is configured to solicit from the consumer 112 (via one or more interfaces displayed at the computing device 120), or potentially from the IoT device 116, various information and rules about the IoT device 116. The solicited information may include, for example, a name of the IoT device 116, an address of the IoT device 116, and a type of the IoT device 116 (if not already provided to the IP 122 by the IoT device 116 upon initial connection). And, the solicited rules may relate to transaction preferences and transaction controls/limitations. Such rules may be directly written by the consumer 112 (e.g., in if-then construct, etc.), or they may be selected by the consumer 112 from various predefined rules that are made available to the consumer 112 by the IP 122, for example. Or, in some examples, the rules may be already present at the IoT device 116 when the consumer 112 purchases/receives the IoT device 116. What's more, upon receiving the rules, the IP 122 may be configured to also evaluate the rules to determine if any are duplicates (e.g., to determine if multiple of the rules may be implicated by the same condition for the same IoT device, etc.) and, when such duplicates are found, to solicit rectification of such duplicate rule(s) from the consumer 112 (e.g., merge the duplicate rules, delete one or more of the duplicate rules, etc.). Further, in connection with soliciting rules from the consumer 112, the IP 122 may be configured to solicit preferences from the consumer 112 (e.g., as part of a consumer profile, etc.), for example, to address scenarios where two merchants offer the same product for the same price (e.g., transit a communication to the consumer 112 to confirm which merchant to use, purchase based on other criteria of the merchants such as location, etc.), to address scenarios where a desired product is not available, to associate priorities with each of the merchants in the merchant data structure (such that selection of a merchant, when all other factors are equal, is then based on the consumer's specified priorities), etc.

Then, upon receipt of the various information and rules, the IP 122 is configured to store the information and rules in the data structure 124.

Regarding the rules solicited by the IP 122 for the IoT device 116 (and potentially for the IoT device 118) in connection with registering it (them) to the IP 122, the rules generally include conditions (e.g., conditions relating to status changes in weights, volumes, counts, cycles, etc.) that, if satisfied, cause a particular action to be initiated (e.g., a purchase transaction, a notification action (e.g., an email notification to the consumer 112, an SMS notification to the consumer 112, etc.), etc.). In various embodiments, the rules (e.g., the condition portions of the rules) may additionally include, or relate to (as further conditions of the rules), different aspects of intended transactions (e.g., a dollar values, a times of day, types of products, etc.), etc.

Several example rules are included in Table 1 for illustration relating to the IoT devices 116 and 118 in the system 100, as well as other IoT devices potentially at the premises 114.

TABLE 1

| Rule Condition | Rule Action |
| --- | --- |
| If IoT device 116 exceeds 14 wash cycles since last laundry detergent purchase | Then purchase 100 ounce Brand X liquid laundry detergent |
| If weight measurement in egg partition of IoT device 118 is less than 10 ounces AND organic eggs are less than $3 per dozen | Then purchase organic eggs |
| If weight measurement in egg partition of IoT device 118 is less than 10 ounces AND organic eggs are more than $3 per dozen | Then request confirmation from consumer 112 to purchase organic eggs |
| If pill receptacle is opened 25 times since last reset AND last refill was more than five days ago | Then notify consumer 112 AND reorder medication included in pill receptacle |
| If pill receptacle is opened 25 times since last reset AND last refill was less than five days ago | Then notify consumer 112 |
| If fuel level in car is below four gallons | Then notify consumer 112 |
| If IoT device 116 usage counter exceeds 500 | Then search for cheapest detergent AND search for product names "liquid" and "Brand X" AND search for |

TABLE 1-continued

| Rule Condition | Rule Action |
| --- | --- |
| | product size "100 ounces" AND purchase 100 ounce Brand X liquid laundry detergent AND send receipt via email |

It should be appreciated that the rules included in Table 1 are merely exemplary in nature, and are not intended to limit the scope of the present disclosure. In addition, and as indicated above, the rules may include rules specifically and uniquely defined by the consumer 112 to provide specific control of the IP 122 and the transactions being initiated therefrom, or they may include rules defined by the issuer 108 associated with the consumer's payment account, or they may include rules defined by other parts of the system or otherwise.

Next in the system 100, once the IoT device 116 is registered to the IP 122, the IP 122 is configured to receive messages from the IoT device 116 regarding various conditions (e.g., changes in status, etc.) relating to the IoT device 116. In connection therewith, when multiple messages are received from multiple IoT devices, the IP 122 is configured to que the multiple messages and address them in an order in which they are received. It should be appreciated that the IoT devices are configured to provide messages to the IP 122 with necessary information to determine if a rule is implicated, or not. And, the messages may include any desired form for providing such information.

For example, when the IoT device 116 determines a particular condition exists (e.g., 15 wash cycles have occurred at the IoT device 116 since laundry detergent was last purchased, etc.), the IoT device 116 is configured to transmit a message to the IP 122 identifying the condition. The message may include, without limitation, the name of the IoT device 116, the address of the IoT device 116, and the condition giving rise to the message (e.g., device name=IoT device 116, current detergent weight=25 ounces, machine usage counter=15; etc.). While in this example the IoT device 116 determines the particular condition (e.g., 15 wash cycles have occurred at the IoT device 116 since laundry detergent was last purchased, etc.), it should be appreciated that in other examples, the IoT device 116 may instead be configured to simply transmit status data to the IP 122 relating to the IoT device 116 (e.g., an indication each time a wash cycle occurs at the IoT device 116, etc.), whereupon the IP 122 is then configured to determine if the received status data for the IoT device 116 satisfies any corresponding rules for the IoT device 116 (e.g., the IP 122 may be configured to maintain a count of total wash cycles for the IoT device 116, etc.), or not. In connection therewith, as another example, the pill receptacle IoT device may send a message to the IP 122 each time a weight of the pill receptacle decreases or a count of tablets within the pill receptacle decreases or a lid of the pill bottle is removed/accessed (e.g., device name=pill bottle, access count=26; etc.). The IP 122 then determines, based on this status data in the received message, whether or not a corresponding rule for the pill receptacle IoT device is implicated.

When a condition or change in status is determined at the IoT device 116 (be it by the IoT device 116 or the IP 122), the IP 122 is configured to access the rules in the data structure 124 and to determine whether the condition satisfies one or more of the rules. For example, for the condition in which 15 wash cycles have occurred at the IoT device 116 since laundry detergent was last purchased, the IP 122 may determine from the rules in Table 1 that the 15 wash cycles exceed the 14 wash cycle threshold for purchasing new laundry detergent. In so doing, the IP 122 determines that the condition satisfies the first rule to purchase new laundry detergent. In turn, when a rule is satisfied by the condition (e.g., the 15 wash cycles that have occurred at the IoT device 116 since laundry detergent was last purchased exceed the 14 wash cycle threshold for purchasing new laundry detergent, etc.), the IP 122 is configured to identify a merchant, for example, the merchant 102, from which to purchase the product identified in the rule (e.g., the laundry detergent, etc.).

In particular when a rule is satisfied, the IP 122 is configured to access a merchant data structure and initially search therein for merchants that offer the requested product for sale (if a particular merchant is not identified in the rule). The IP 122 is configured to then preliminarily select a merchant based on a description of the product, based on a price of the product, and/or based on any other appropriate criteria, etc. With that said, the merchant data structure may be local to the premises 114 (e.g., part of the data structure 124, etc.) and may include merchant profiles for multiple merchants (e.g., merchants approved by the consumer 112, merchants at which the consumer 112 has previously purchased products, etc.). Or, the merchant data structure may be remote from the premises 114 (e.g., located at the merchant 102 and/or in association with multiple merchants, etc.), and may include a merchant profile for the merchant 102 only, or for the multiple different merchants with which it is associated. In any case, the merchant profile for each of the merchants includes an entry for each of the various products offered for sale by the merchant (to facilitate the search by the IP 122) and, for each product, a price and a description, etc. It should be appreciated that, in several embodiments, the merchant 102 (and other merchants having such profiles) is (are) configured to actively manage its profile to provide "specials" on certain products (or other offers relating to product prices), rather than merely providing the prices, and then push such data to the IP 122 electronically (for storage in the merchant data structure, and without directly spamming the consumer 112 with such information). Further, such managed merchant profiles may include different prices for products, based on available stock of the products, times of day/month/year, etc. This is generally performed by the merchant 102, for example, through messages/communications with the IP 122, at one or more intervals (regular or irregular) in accordance with a pre-defined protocol (which can be updated at both the merchant and the IP 122, as necessary, to allow for and/or provide more complex communications). Alternatively, the IP 122 may be configured to contact the merchants, at appropriate times (e.g., prior to performing a purchase, etc.), and pull merchant data from the merchants (e.g., prices, offers, etc.) whereby the merchant profiles for the merchants are then updated in the merchant data structure. Regardless, in this manner, the IP 122 is aware of the various different products provided by the merchant 102 and their corresponding prices, as well as transaction information for the merchant 102 (e.g., an indicator of the merchant's bank, i.e., acquirer 104; etc.).

Finally, after evaluating the applicable rules, the IP 122 (generally, on behalf of the IoT device 116) is configured to initiate a payment account transaction for the product requested/identified by the IoT device 116 with the selected merchant 102 (e.g., a payment account transaction for the laundry detergent, etc.). In so doing, the IP 122 is configured to compile an authorization request for the transaction and transmit the authorization request directly to the acquirer 104 associated with the merchant 102, along path B in FIG. 1 (without direct involvement of the merchant 102 or the consumer 112). In turn, the acquirer 104 communicates the authorization request with the issuer 108 (associated with the consumer's payment account), via the payment network 106, in a similar manner to that described above for the example transaction proceeding along path A in the system 100 (which thus similarly subjects the transaction to the services associated with the payment network 106 and/or the issuer 108 (e.g., fraud service, account controls, etc.)). Once received at the issuer 108, and when approved (or declined), the issuer 108 is configured to transmit an authorization reply back to the IP 122, again, along path B. Upon receipt of the reply, the IP 122 is configured to transmit a notification to the consumer 112, including, for example, a receipt for the transaction. In addition, if the transaction is approved, the IP 122 is configured to transmit a notification to the selected merchant (e.g., the merchant 102, etc.), to facilitate delivery of the product to the consumer 112. This may include making the product available for pick-up at a merchant location, or facilitating shipping of the product to the consumer 112.

In the above payment account transaction, the authorization request generally includes, without limitation, an indication of the consumer 112 (e.g., a consumer ID, a name of the consumer 112, etc.), the PAN for the consumer's payment account (or a token linked thereto), the expiration date of the consumer's payment account, a CVC for the consumer's payment account, a category for the IoT device 116 (e.g., washing machine, etc.), an indication of and other data relating to the merchant 102 from which the product is being purchased (e.g., merchant name, merchant ID, MCC, etc.), an indication of the product being purchased, and a price of the product (including tax, for example, as determined by the merchant 102). In addition, in this particular transaction, the authorization request further includes an indicator of the origin of the transaction, i.e., the IP 122. The indicator may be specific to the IP 122 (e.g., an ID for the IP 122, etc.), or may be generic to multiple IPs including the IP 122. But regardless, through the indicator, the issuer 108 is informed that the transaction is provided from the IP 122, and not from the merchant 102.

In an example interaction in the system 100 between an automobile IoT device and the IP 122, the consumer 112 may drive the automobile to work and then home to the premises 114. Upon returning to the consumer's premises 114, the automobile connects to the IP 122 and transmits a message indicating a current fuel level, a current oil level, a current battery condition, and current tire conditions. Such a message may include, for example:

Name: Automobile IoT Device
Fuel: 3 gallons
Oil capacity: 80%
Tire 1 condition: 80%
Tire 2 condition: 80%
Tire 3 condition: 80%
Tire 4 condition: 80%
Battery level: 40%

Also in this example, the consumer 112 may have previously provided four different rules for the automobile IoT device. The first rule may include "If message is from automobile IoT device and battery level is less than 50%, then search for the product "Super Car Battery" and validate with consumer 112 prior to purchase." The second rule may include "If message is from automobile IoT device and tire 1, 2, 3, or 4 condition is less than 60%, then check with Merchants A, B, and C for Brand X tires in stock and email consumer 112 tire 1, 2, 3, or 4 condition and email consumer 112 approval to purchase new tire and deliver new tire to premises 114." The third rule may include "If message is from automobile IoT device and fuel is less than four gallons, then email fuel level to consumer 112." And, the fourth rule may include "If message is from automobile IoT device and battery level is less than 60%, then check with Merchants A, B, and C for Brand X battery in stock and email battery level to consumer 112 and approval to purchase new battery and deliver new battery to premises 114." In view of the above message received from the automobile, the IP 122 determines that the third and fourth rules are implicated by the message. Regarding the third rule, the IP 122 transmits an email to the consumer 112 indicating that the fuel level for the automobile is three gallons. And, regarding the fourth rule, the IP 122 searches in the merchant data structure for Merchants A, B, and C for the Brand X battery. Upon determining that Merchant A has the Brand X battery in stock and at the cheapest price, the IP 122 transmits an email to the consumer 112 indicating that the battery level is 40% and confirms that a new battery has been purchased from Merchant A. The IP 122 then also performs a payment account transaction for the new battery from Merchant A as described above (e.g., with the transaction generally following path B in FIG. 1, etc.).

FIG. 3 illustrates an exemplary method 300 for initiating a payment account transaction for a product at a merchant, based on a request for the product by an IoT device, by directing an authorization request for the transaction to an acquirer associated with the merchant rather than to the merchant. The exemplary method 300 is generally described with reference to the system 100 and to the computing device 200. Nonetheless, it should be understood that the methods herein (including the method 300) are not limited to the exemplary system 100, or the exemplary computing device 200, and similarly, that the systems and the computing devices herein are not limited to the exemplary method 300.

For purposes of illustration, the method 300 is described with respect to two different scenarios: one involving a health care IoT device (not shown) at the premises 114, and the other involving the washing mashing IoT device 116 at the premises 114. Both IoT devices are registered with the IP 122, for example, as described above in the system 100.

Initially in the method 300, for both of the scenarios, the IP 122 is listening for conditions from the various IoT devices at the premises 114 regarding their status (e.g., the IP 122 is listening for messages from the IoT devices reporting such conditions, etc.). In connection therewith, in the first scenario, the health care IoT device detects a low medical condition. For example, the health care IoT device may include a pill receptacle and/or sensor associated therewith, whereby a counter sensor detects that the pill receptacle has been opened a predefined number of times, or a weight sensor detects that a weight of the pill receptacle is below a predefined value, etc. In response, the health care IoT device communicates the condition (or multiple conditions) to the IP 122 by way of a message, via a network at the premises 114 (e.g., as part of network 110, a network separate from network 110, etc.). And in turn, the IP 122 receives the message from the medical device IoT device, at 302. It should be appreciated that the condition(s) transmitted by the IoT device may include any different condition(s) of the IoT device (e.g., status, etc.) and/or aspect of the IoT device, and should not be understood to be limited to a condition relative to a threshold. Specifically, for example, the health care IoT device may transmit a condition to the IP 122 regardless of any defined threshold, for example, a number of openings of the pill receptacle each morning at 5:00 AM, a weight of the pill receptacle each morning at 5:00 AM, etc.

Once the condition(s)/message is received from the health care IoT device, in the first scenario, the IP 122 accesses the rules for the consumer 112, at 304, as included in the data structure 124 (e.g., in memory 204, etc.). In so doing, the IP 122 may access the rules based on the particular condition(s) received from the health care IoT device (e.g., based on content of the message received from the health care IoT device, etc.) and/or based on the health care IoT device itself, as filters (e.g., based on classification of the rules in the data structure 124, etc.). Or, the IP 122 may simply access all rules. The IP 122 then determines, at 306, whether any of the accessed rules are applicable to the received condition(s). When a rule is not satisfied by the received condition(s), the IP 122 ends the method 300, at 308. However, when a rule is satisfied by a condition of the health care IoT device as included in the message, the IP 122 next determines what action to take based on the corresponding rule. For example, and with reference to the exemplary rules of Table 1, the message from the health care IoT device may indicate that the pill receptacle has been opened 26 times. In turn, the IP 122 determines that this condition satisfies the first rule in Table 1 relating to the pill receptacle (also determining that the last refill for the medicine in the health care IoT device was two weeks ago), which calls for notifying the consumer 112 and reordering the medication included in the pill receptacle. As such, in the illustrated method 300, the IP 122 identifies the product to be purchased, at 310 (e.g., based on the rule, based on medicine data associated with the health care IoT device in the data structure 124, etc.).

Next in the method 300, the IP 122 accesses, at 312, the merchant data structure to find the identified product (e.g., the medication in the first scenario, etc.) and to determine a price for the purchase of the product. In accessing the merchant data structure, the IP 122 may access the various merchant profiles included therein and search in the various merchant profiles (i.e., in the product entries of the various merchant profiles) for the identified product. The IP 122 then determines prices and/or other conditions of the requested transaction for the identified product, based on the search, from the various merchants found to offer the product for sale. Table 2 illustrates four exemplary product options that may be identified by the IP 122, from the merchant data structure (at 312 in the method 300), in response to a search for the medication product in the first scenario herein (where the medication product includes Ibuprofen 200 mg, 500 tablets).

TABLE 2

| Merchant | Product identifier | Product description | Price |
| --- | --- | --- | --- |
| Merchant A | IBP-2100 | Ibuprofen 200 mg, 500 tablets | $7.89 |
| Merchant 102 | IBP-2100 | Ibuprofen 200 mg, 500 tablets | $7.48 |
| Merchant B | IBP-2100 | Ibuprofen 200 mg, 500 tablets | $10.19 |
| Merchant C | IBP-2100 | Ibuprofen 200 mg, 500 tablets | $8.49 |

Then, based on comparison of the various product options available for purchase for the identified product, the IP 122 selects, at 314, a particular merchant (associated with a particular one of the medication product options) from which to actually purchase the product. It should be appreciated that a variety of factors may be considered, by the IP 122, in selecting the merchant (over other merchants). For example, the IP 122 may consider price of the various product options, location of the merchants associated with the various product options, preference for one merchant over another (or over others), etc. In connection with the product options in Table 2, for example, the IP 122 may select to purchase the medication product from merchant 102 based on its lower price.

The IP 122 next identifies the acquirer for the selected merchant (e.g., from the merchant profile for the merchant, etc.), and compiles and transmits an authorization request for the purchase transaction, at 316, to the acquirer (e.g., to the acquirer 104 associated with the selected merchant 102 in the first scenario, etc.), instead of directly to the selected merchant (and generally independent of the consumer 112). In turn, the acquirer communicates the authorization request with the issuer 108 (associated with the consumer's payment account), via the payment network 106, in a similar manner to that described above. And in response, the issuer 108 transmits an authorization reply back to the IP 122 (either approving or declining the transaction), rather than the merchant 102, based on the indicator included in the authorization request identifying that the transaction is provided by the IP 122. The IP 122, then, receives the authorization reply, at 318, and determines if the transaction is approved or declined, at 320. When the authorization reply indicates that the transaction is declined, at 320, the method 300 ends, at 322. However, when the authorization reply indicates that the transaction is approved, at 320, the IP 122 transmits a notification to the consumer 112, at 324, indicating the approval and including, for example, a receipt for the transaction (e.g., in general for each transaction, when specified by the particular rule that is implicated, etc.). In addition, the IP 122 transmits a notification to the selected merchant 102, at 326, indicating the approval of the transaction and thereby allowing the merchant 102 to facilitate delivery of the product to the consumer 112, for example, when specified in the particular rule that is implicated (e.g., the medication product in the first scenario, etc.).

Alternatively (or additionally) in the method 300, if the rule implicated by the message received from the health care IoT device, at 302, includes an action requiring approval of the consumer 112 prior to performing the purchase transaction (e.g., if it has been less than 5 days since a like/similar transaction, as indicated in the rules of Table 1; etc.), the IP 122 may (as indicated by the dotted lines in FIG. 3) transmit a permission request to the consumer 112 for the transaction, at 328. In connection therewith, the IP 122 determines, at 330, whether permission is received from the consumer 112. And, when the IP 122 receives the necessary permission from the consumer 112 for the purchase transaction, at 330, the IP 122 proceeds to compile and transmit the authorization request for the transaction, at 316, as described above. However, when the IP 122 does not receive permission from the consumer 112 for the purchase transaction, at 330, the IP 122 terminates the transaction, at 332.

In the second scenario, the IP 122 is again listening for conditions from the various IoT devices at the premises 114 regarding their status (e.g., the IP 122 is listening for messages from the IoT devices reporting such conditions, etc.). In connection therewith, in this scenario, the IoT device 116 detects the condition that 15 wash cycles have occurred at the IoT device 116 since laundry detergent was last purchased (e.g., which exceeds a predefined 14 wash cycle threshold for ordering new laundry detergent, etc.), and communicates the condition to the IP 122 by way of a message, via the network at the premises 114 (as described in the first scenario). In turn, the IP 122 receives the message from the IoT device 116, at 302. It should again be appreciated that the condition transmitted by the IoT device 116 may include any different condition(s) of the IoT device 116 (e.g., status, etc.) and/or aspect of the IoT device 116, and should not be understood to be limited to a condition relative to a threshold, etc. Specifically, for example, the IoT device 116 may simply transmit a condition to the IP 122 regardless of any defined threshold, for example, an indication that a wash cycle has been completed, regardless of whether new laundry detergent needs to be ordered or not (where the IP 122 then maintains a count of the received wash cycle counts).

Once the condition/message is received from the IoT device 116, the IP 122 accesses the rules for the consumer 112, at 304, as included in the data structure 124 (e.g., in memory 204, etc.). In so doing, the IP 122 may access the rules based on the particular condition received from the IoT device 116 (e.g., based on content of the message received from the health care IoT device, etc.) and/or based on the IoT device 116, itself, as filters (e.g., based on classification of the rules in the data structure 124, etc.). Or, the IP 122 may simply access all rules. The IP 122 then determines, at 306, whether any of the accessed rules are applicable to the received condition. When a rule is not satisfied by the received condition, the IP 122 ends the method 300, at 308. However, when a rule is satisfied by the condition of the IoT device 116 as included in the message, the IP 122 next determines what action to take based on the corresponding rule. For example, and with reference to the exemplary rules of Table 1, the message from the IoT device 116 may indicate that 15 wash cycles have occurred at the IoT device 116 since laundry detergent was last purchased. In turn, the IP 122 determines that this condition satisfies the rule in Table 1 relating to the IoT device 116, which calls for ordering the 100 ounce Brand X liquid laundry detergent. As such, in the illustrated method 300, the IP 122 identifies the product to be purchased, at 310 (e.g., based on the condition received from the IoT device 116, based on the transaction rule, etc.).

Next in the method 300, the IP 122 accesses, at 312, the merchant data structure to find the identified product (e.g., the Brand X liquid laundry detergent in the second scenario, etc.) and to determine a price for the purchase of the product. In accessing the merchant data structure, the IP 122 may access the various merchant profiles included therein and search in the various merchant profiles (i.e., in the product entries of the various merchant profiles) for the identified product. The IP 122 then determines prices and/or other conditions of the requested transaction for the identified product, based on the search, from the various merchants found to offer the product for sale. Table 3 illustrates four exemplary product options that may be identified by the IP 122, from the merchant data structure (at 312 in the method 300), in response to a search for the Brand X liquid laundry detergent product in the second scenario herein.

TABLE 3

| Merchant | Product identifier | Product description | Price |
| --- | --- | --- | --- |
| Merchant A | XLT24-001 | Brand X liquid laundry detergent, 100 ounces | $10.89 |
| Merchant 102 | XLT24-001 | Brand X liquid laundry detergent, 100 ounces | $12.48 |
| Merchant B | XLT24-001 | Brand X liquid laundry detergent, 100 ounces | $11.19 |
| Merchant C | XLT24-001 | Brand X liquid laundry detergent, 100 ounces | $11.49 |

Then, based on comparison of the various product options available for purchase for the identified product, the IP 122 selects, at 314, a particular merchant (associated with a particular one of the laundry detergent options) from which to actually purchase the product. It should again be appreciated that a variety of factors may be considered, by the IP 122, in selecting the merchant (over other merchants). For example, the IP 122 may consider price of the various product options, location of the merchants associated with the various product options (particularly where product delivery to the premises 114 is part of the action portion of a rule), preference for one merchant over another (or over others), etc. In connection with the product options in Table 3, for example, the IP 122 may initially select to purchase the laundry detergent product from merchant A based on its lower price.

The IP 122 next identifies the acquirer for the selected merchant A (e.g., from the merchant profile for the merchant A, etc.), and compiles and transmits an authorization request for the purchase transaction, at 316, to the acquirer, instead of directly to the selected merchant A. In turn, the acquirer communicates the authorization request with the issuer 108 (associated with the consumer's payment account), via the payment network 106, in a similar manner to that described above. And in response, the issuer 108 transmits an authorization reply back to the IP 122 (either approving or declining the transaction), rather than the merchant A, based on the indicator included in the authorization request identifying that the transaction is provided by the IP 122. The IP 122, then, receives the authorization reply, at 318, and determines if the transaction is approved or declined, at 320. When the authorization reply indicates that the transaction is declined, at 320, the method 300 ends, at 322. However, when the authorization reply indicates that the transaction is approved, at 320, the IP 122 transmits a notification to the consumer 112, at 324, indicating the approval and including, for example, a receipt for the transaction (e.g., in general for each transaction, when specified by the particular rule that is implicated, etc.). In addition, the IP 122 transmits a notification to the selected merchant A, at 326, indicating the approval of the transaction and thereby allowing the merchant A to facilitate delivery of the product to the consumer 112, for example, when specified in the particular rule that is implicated (e.g., the laundry detergent product in the second scenario, etc.).

The above example scenarios are provides for purpose of illustration only. As such, it should be appreciated that various other example scenarios may exist, which would implicate various rules (or not) included in the data structure 124, as applied by the IP 122.

As an example, an IoT device at the consumer's premises 114 in the system 100 may include an automobile. In connection therewith, the automobile IoT device may detect that a total mileage for the automobile has increased by 5,000 miles since oil for the automobile was last changed. In response, the automobile IoT device communicates the mileage condition to the IP 122 by way of a message, via a network at the premises 114. In turn, the IP 122 accesses the rules for the consumer 112, as included in the data structure 124, and determines whether any of the accessed rules are applicable to the received condition. In this example, the IP 122 determines that this condition satisfies a rule relating to mileage of the automobile, which calls for ordering 5 quarts of Brand Y oil for delivery to the premises 114.

Next in this example, the IP 122 accesses the merchant data structure to find the identified Brand Y oil product and to determine a price for the purchase of the product. Based on comparison of the various product options available for purchase for the Brand Y oil product, the IP 122 selects a particular merchant from which to actually purchase the product (e.g., based on price, based on availability of 5 quarts, etc.). Then, the IP 122 proceeds to compile and transmit an authorization request for the transaction, as described above.

As another example, an IoT device at the consumer's premises 114 in the system 100 may include a television. In connection therewith, the television IoT device may detect that a new movie is available for viewing involving actor John Smith. In response, the television IoT device communicates the movie condition to the IP 122 by way of a message, via a network at the premises 114. In turn, the IP 122 accesses the rules for the consumer 112, as included in the data structure 124, and determines whether any of the accessed rules are applicable to the received condition. In this example, the IP 122 determines that this condition satisfies a rule relating to the actor John Smith, which calls for ordering the new movie for delivery to the premises 114 (and specifically, for delivery to a video library for the consumer 112 accessible through the television IoT device).

Next in this example, the IP 122 accesses the merchant data structure to find the identified movie product and to determine a price for the purchase of the product. Based on comparison of the various product options available for purchase for the movie product, the IP 122 selects a particular merchant from which to actually purchase the product (e.g., based on price, based on HD availability, etc.). Then, the IP 122 proceeds to compile and transmit an authorization request for the movie transaction, as described above.

In view of the above, the systems and methods herein enable IoT devices to generally automatically perform purchase transactions with merchants (via the IP 122), as necessary and in accordance with various consumer implemented and/or approved rules (such that the consumer 112 still maintains control over the transactions without directly participating therein), whereby authorization requests for the transactions are communicated directly to acquirers of the merchants without intervention from the merchants (e.g., such that the merchants do not need to have technology (e.g., point-of-sale devices, necessary transaction interfaces, etc.) or personal in place to pass the requests themselves to the acquirers, etc.). In connection therewith, the merchants simply interact with the IP 122 to provide updated product/price data, acquirer data, etc. for use in the subsequent purchase transactions. Further, depending on the consumer implemented and/or approved rules, the IP 122 performs the bulk of the operations without additional input from the consumer 112, unless the particular rules specify transmitting communications to the consumer 112 in connection with the various purchase transactions being performed (e.g., for approval, for confirmation, etc.).

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) receiving a message from an IoT device at a premises, the message including a condition related to the IoT device; (b) determining, based on at least one rule in memory, whether to initiate a transaction at a merchant to purchase a product and/or a related product based on the condition; and (c) transmitting, to an acquirer associated with the merchant, rather than to the merchant, an authorization request for the transaction for the product and/or the related product when the condition satisfies the at least one rule.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements/features recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for facilitating payment account transactions, based on Internet of Things (IoT) devices, to acquirers, the method comprising:
   receiving, by an interface processor, a message from an IoT device at a premises, the message including a usage of the IoT device, the message received independent of a user input at the IoT device;
   determining, by the interface processor, whether the usage satisfies at least one rule in memory, the at least one rule indicative of whether to initiate a transaction at a merchant to purchase a product associated with the IoT device and/or a related product;
   in response to the usage satisfying the at least one rule, compiling, by the interface processor, an authorization request for the transaction for the product and/or the related product; and
   transmitting to an acquirer associated with the merchant, by the interface processor, rather than to the merchant, the authorization request for the transaction, wherein the interface processor is separate from the IoT device, the acquirer and an issuer of a payment account, and whereby the acquirer transmits the authorization request to the issuer of the payment account, via a payment network, to seek authorization by the issuer for said transaction to the payment account.

2. The method of claim 1, further comprising searching, by the interface processor, in a merchant data structure for the product and/or the related product.

3. The method of claim 2, further comprising selecting the merchant from multiple different merchants in the merchant data structure based on one or more of the at least one rule and a consumer preference for a consumer associated with the IoT device.

4. The method of claim 3, further comprising:
soliciting, by the interface processor, via a network-based application, the at least one rule and the consumer preference for the consumer; and
storing, by the interface processor, the at least one rule and the consumer preference in a data structure in association with the consumer.

5. The method of claim 3, further comprising, prior to transmitting the authorization request, requesting permission from the consumer for the transaction; and
wherein transmitting the authorization request includes transmitting the authorization request in response to a permission provided from the consumer for the transaction.

6. The method of claim 1, further comprising notifying, by the interface processor, the merchant of the transaction, when an authorization reply approving the transaction is received in response to the authorization request.

7. The method of claim 6, further comprising, in response to the authorization reply approving the transaction, transmitting, by the interface processor, a receipt for the transaction to a consumer associated with the IoT device.

8. The method of claim 1, further comprising receiving, by the interface processor, product data from multiple different merchants, including the merchant, and storing the product data in a merchant data structure in association with the corresponding merchant from which the product data is received.

9. A system for facilitating payment account transactions, based on Internet of Things (IoT) devices, to acquirers, the system comprising:
a memory comprising multiple rules relating to usage of IoT devices at a premises, and comprising merchant profiles for each of multiple merchants, each merchant profile including products available for purchase through the particular merchant and corresponding prices for the products; and
an interface processor at the premises and in communication with the memory, the interface processor configured to:
connect to an IoT device at the premises;
receive a message from the IoT device, the message including a usage related to the IoT device, wherein the message is received independent of a user input at the IoT device;
retrieve at least one of the multiple rules from the memory and compare the usage to the at least one of the multiple rules;
in response to the usage satisfying the at least one of the multiple rules, identify one of the multiple merchants in the memory from which to initiate a payment account transaction for a product related to the IoT device;
compile an authorization request for the product; and
transmit the authorization request for the product to an acquirer associated with the identified one of the multiple merchants, rather than to the one of the multiple merchants, wherein the interface processor is separate from the IoT device, the acquirer and an issuer of a payment account, whereby the acquirer transmits the authorization request to the issuer of the payment account, via a payment network, to seek authorization by the issuer for the payment account transaction for the product.

10. The system of claim 9, wherein the interface processor is configured, in connection with retrieving the at least one of the multiple rules from the memory, to identify the at least one of the multiple rules based on the IoT device.

11. The system of claim 9, wherein the interface processor is further configured to:
solicit, via a network-based application, the multiple rules from a consumer associated with the IoT device; and
store the multiple rules in the memory.

12. The system of claim 11, wherein the interface processor is further configured to:
receive, from each of the multiple merchants, at one or more intervals, data relating to the products available for purchase through the merchants and corresponding prices for the products; and
generate and/or update the merchant profiles for the multiple merchants based on the received data.

13. The system of claim 9, wherein the interface processor is further configured, in connection with identifying the one of the multiple merchants, to search in the memory for the product.

14. The system of claim 9, wherein the interface processor is further configured to:
connect with at least another IoT device at the premises;
receive a message from the at least another IoT device, the message including a usage related to the at least another IoT device; and
que the message received from the at least another IoT device in the memory with the message received from the IoT device based on an order of receipt of the messages.

15. The system of claim 9, wherein the interface processor is further configured to notify the identified one of the multiple merchants of the transaction, when an authorization reply approving the transaction is received in response to the authorization request.

16. The system of claim 15, wherein the interface processor is further configured to transmit a receipt for the transaction to a consumer associated with the IoT device, based on the at least one of the multiple rules.

17. A non-transitory computer-readable storage media including executable instructions for use in facilitating payment account transactions to acquirers, based on Internet of Things (IoT) devices, which, when executed by an interface processor, cause the interface processor to:
connect with an IoT device at a premises and store an identifier for the IoT device in a data structure;
receive a message from the IoT device, the message including a usage related to the IoT device, wherein the message is received independent of a user input at the IoT device;
retrieve at least one rule from a data structure and compare the usage to the at least one rule;
in response to the usage satisfying the at least one rule, identify a product related to the IoT device and identify a merchant from which to initiate a payment account transaction for the product;
compile an authorization request for the product and append the identifier for the IoT device in the authorization request; and
transmit the authorization request for the product to an acquirer associated with the merchant, rather than to the merchant, wherein the interface processor is separate from the IoT device, the acquirer and an issuer of a payment account to which the payment account transaction is directed, whereby the acquirer transmits the authorization request to the issuer of the payment account, via a payment network, to seek authorization for the payment account transaction by the issuer to the payment account.

18. The non-transitory computer-readable storage media of claim 17, wherein the executable instructions, when executed by the interface processor in connection with identifying the product related to the IoT device, cause the interface processor to identify the product based on the at least one rule.

19. The non-transitory computer-readable storage media of claim 17, wherein the executable instructions, when executed by the interface processor in connection with identifying the merchant, cause the interface processor to identify the merchant based on at least one preference received from a consumer associated with the IoT device.

* * * * *